July 15, 1941.  J. GOLDMANN  2,248,984
SYSTEM FOR DETERMINING NAVIGATORY POSITIONS
Filed Jan. 18, 1939
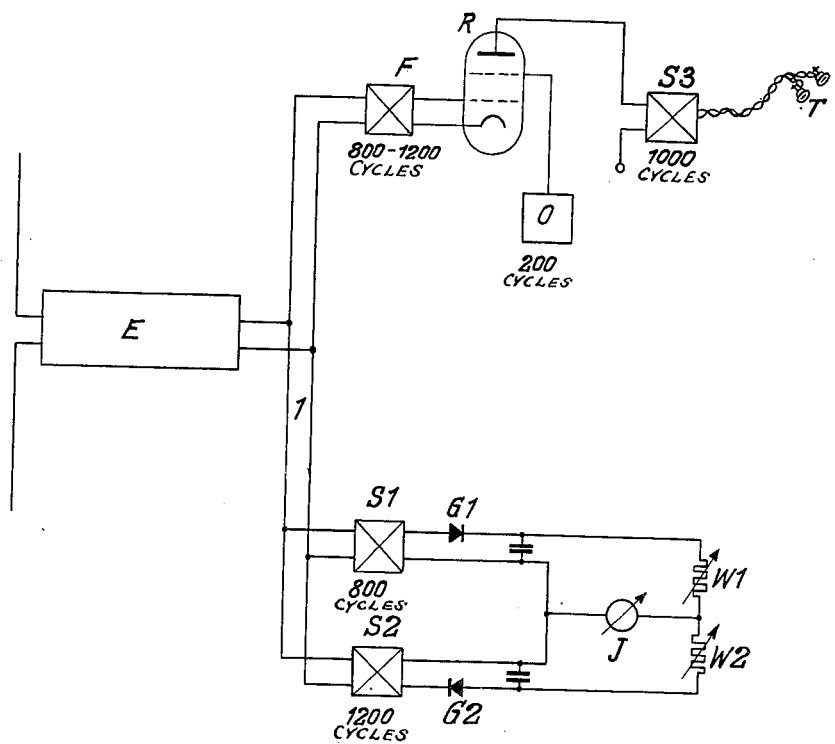
Inventor:
Joachim Goldmann
by E.T. Hinney
Att'y Patented July 15, 1941

2,248,984

UNITED STATES PATENT OFFICE 2,248,984

SYSTEM FOR DETERMINING NAVIGATORY POSITIONS

Joachim Goldmann, New York, N. Y., assignor to C. Lorenz Aktiengesellschaft, Berlin-Tempelhof, Germany, a company Application January 18, 1939, Serial No. 251,497
In Germany January 19, 1938

6 Claims. (Cl. 250—11)

The invention relates to methods of determining positions, such as positions of aircraft, by means of high frequency radiations. More particularly, the invention is concerned with those methods of this kind in which a radio transmitter is arranged to produce directional radiation diagrams by a keying operation effected in the rhythm of complementary signals and in such manner that the signals of one kind, such as dots or the Morse signal $a$, are produced in the intervals between the signals of the other kind, such as dashes or the Morse signal $n$. In the line of equal field intensity of the two radiation diagrams or patterns these signals complete each other to form an uninterrupted signal spoken of as continuous dash line. On the receiving side this continuous dash line is reproduced by a telephone, in order to be followed as a course line for navigation purposes.

Methods of the kind here referred to require that, in addition to the aural indication effected by the telephone, an optical indication be provided to make the course lines and deviations therefrom visible. In order to perform this, a number of methods have been devised all of which, however, have certain disadvantages. For instance, a known method is such that the two different antenna diagrams are not produced in the rhythm of complementary signals, but are modulated with different tone frequencies. The indication is effected by means of frequency sensitive indicators adapted to respond to the amplitude difference of the two different modulating frequencies. The disadvantage of this method is that only a visual indication is enabled, no aural comparison of the field intensities being possible. It is however necessary, for instance on aeroplanes, that in addition to the visual indication an aural comparison be possible, since the pilot has sometimes to observe a plurality of instruments. He will then be able to change from the visual to the aural indication.

The invention described hereafter relates to methods of the kind which allow aural and visual indications to be obtained both at the same time. On the transmitting side the novel method is such that the complementary keying signals are modulated with different modulating frequencies. For instance, the Morse signal $a$ or the dot, as the case may be, is modulated with a frequency other than that used for modulating the Morse signal $n$ or the dash, respectively. On the receiving side, in order to provide for the visual indication the different modulating frequencies are separated from each other by means of filter chains or similar selective devices and are in well-known manner compared with one another by an indicating instrument. In the case of equal amplitudes of the different modulating frequencies the indicating device remains in its state of rest, whereas in the event of one modulating frequency preponderating the pointer of the indicating instrument is deflected either to the right or to the left, according to the direction in which the position to be ascertained is displaced with respect to the guide beam.

As in the case of the invention the modulating frequencies of the complementary signals are different from each other, the continuous dash line will not be heard as a tone of equable intensity, that is, a tone not fluctuating in the rhythm of keying. Therefore, for the purpose of aural indication it is proposed by the invention so to influence the different modulating frequencies of the keying signals that both keying signals shall be of the same audio frequencies, these being the frequencies to be compared with each other.

Influencing the modulating frequencies in this manner is in the nature of a frequency transformation that may be effected in different ways. For instance, a frequency multiplication may be resorted to or equifrequent harmonics may be filtered out of the two modulating frequencies.

In accordance with a further feature of the invention the aural comparison is rendered possible by heterodyning the two signal modulating frequencies in a manner to obtain equal summation or differential frequencies, as the case may be. In order to achieve this, separate heterodyne devices may be used for affecting both signal modulating frequencies, the frequencies thereof being so chosen that for both keying signals the same audio frequencies, that is, summation or differential frequencies, shall arise in the telephone. These frequencies are in well known manner observed and compared with each other by aural comparison. Preferably, from the plurality of the heterodyne frequencies so produced those frequencies are filtered out which equal each other and which are to be observed, in order that the other resultant summation or differential frequencies shall not be able to interfere with the observation.

In accordance with still another feature of the invention this method is simplified by influencing both modulating frequencies by means of the same heterodyne device, the frequency thereof being so chosen that the summation frequency of one signal is equal to the differential frequency of the other signal.

The accompanying drawing shows the circuit arrangement of one embodiment of the invention.

Suppose by way of example that on the transmitting side the keying signal of one kind, such as the Morse signal $a$ or a dot, is modulated with 800 cycles per second, that is to say, with 800 cycles per second, while the keying signal of the other kind, such as $n$ or a dash, is modulated with 1200 cycles per second. For the purpose of visual indication both modulating frequencies are conveyed from the output circuit of a receiver E and over a line 1 to filter chains S1, S2 one of which is tuned to 800 cycles per second, while the other is tuned to 1200 cycles per second. These filter chains act to separate the two modulating frequencies from each other. These then pass through rectifiers G1, G2 and are thereupon compared with each other by an indicating instrument J. Instrument J either indicates the difference of the two modulating frequencies or, in accordance with a feature of the invention, indicates the quotient of the two frequencies. In the latter case the invention provides for using as indicating instrument a so-called quotient-meter of well known type for example, as shown in my copending application Ser. No. 251,496 filed January 18, 1939. Devices of this kind have the advantage that the indication is independent of the receiving field intensity and that, therefore, a separate amplitude regulation, which otherwise would be necessary, is not needed here. The indicating instrument may be calibrated in values suitable to indicate the respective dstances from the guide beam. The mid-position of the pointer of such instrument is obtained by adjusting variable resistances W1, W2. In the case of complementary signals which, when graphically represented, are of the same area, such as $a$ and $n$, the resistances W1, W2 are equal to each other. With complementary signals not possessed of this property, such as dot and dash, the correct mid-position is obtained by adjusting either one or the other of the resistances W1, W2.

For the purpose of aural indication the modulating frequencies taken from receiver E are conveyed to an electronic tube R in which they are heterodyned with a frequency of 200 cycles per second generated in an oscillator O. The output circuit of tube R then contains the following frequencies—

In the case of signal $a$: 600 cycles per second, 800 cycles per second, 1000 cycles per second.

In the case of signal $n$: 1000 cycles per second, 1200 cycles per second, 1400 cycles per second.

The summation frequency of one signal will thus equal the differential frequency of the other signal, both amounting to 1000 cycles per second. For enabling the aural comparison of the two a filter chain S3 tuned to 1000 cycles per second and having a telephone T connected to its output circuit is fitted to the output circuit of tube R. This filter chain only allows the frequency of 1000 cycles per second, this being the frequency to be observed, to pass through, while the disturbing frequencies of 600 cycles per second, 800 cycles per second, 1200 cycles per second and 1400 cycles per second are by such filter chain segregated therefrom. The two keying frequencies may now in the customary manner be compared with each other by aural comparison.

In order to reduce disturbing effects, a filter F is arranged in advance of the mixing tube R. This filter allows the signal modulating frequencies 800 cycles per second and 1200 cycles per second to pass through, while it segregates disturbing frequencies which are higher or lower than these. The filtering means here used are preferably band filters.

The heterodyne arrangement consisting of mixing tube R and oscillator O may be simplified by comprising these two in one tube. Heterodyne arrangements in which the mixing tube also serves to generate the heterodyning frequency are well known in connection with radio receiving equipment. In the present case the indicating apparatus is considerably simplified by such combination.

What is claimed is:

1. In a system comprising a radio transmitter for radiating complementary keying signals, adapted to complete each other to produce a course line, said signals being modulated with different distinguishing frequencies and movable receivers intended to follow this course line by amplitude comparison of the received signal, the method comprising, receiving said modulated keyed signals at a receiver, detecting said signals to derive the distinguishing frequencies, changing the distingushing frequencies to the same audio frequency and producing an audible comparison of said changed signals.

2. A method as defined in claim 1, wherein said change in distinguishing frequencies is produced by heterodyning said signals.

3. A method as defined in claim 1, wherein said change in distinguishing frequencies is produced by heterodyning them with the same frequency such that the summation frequency of one distinguishing frequency equals the differential frequency of the other distinguishing frequency.

4. A guiding system receiver for use with a beacon for transmitting signals on either side of a course so that the course may be determined by equality of signals having means for characterizing each of said signals by keying signals and different frequency modulations, comprising means for receiving said signals and deriving the modulation frequencies therefrom, a frequency changing device, means for conveying said modulation frequencies to said frequency changing device to change them to the same audio frequency, an audio indicator and means for coupling the output of said frequency changer to said audio indicator to produce an audible signal comparison indication.

5. A guiding system according to claim 4, wherein said frequency changer comprises means for beating said modulation frequencies with the same heterodyne frequency such that the upper beat frequency produced by one corresponds to the lower beat frequency produced by the other modulation frequency, further comprising a filter designed to pass only the common beat frequency disposed between the output of said frequency changer and said audio indicator.

6. A guiding system according to claim 4, wherein said frequency changer comprises an electronic mixing tube, and a source of heterodyning frequency coupled to said mixing tube.

JOACHIM GOLDMANN.